United States Patent [19]
Raidel

[11] 3,794,344
[45] Feb. 26, 1974

[54] VEHICLE AIR SUSPENSION ASSEMBLY

[76] Inventor: John E. Raidel, Rt. 9, Box 400-M, Springfield, Mo. 65804

[22] Filed: July 10, 1972

[21] Appl. No.: 270,253

[52] U.S. Cl............................ 280/124 F, 267/15 R
[51] Int. Cl............................................. B60g 11/28
[58] Field of Search.......... 267/15 R, 15 A; 280/124

[56] References Cited
UNITED STATES PATENTS
2,903,256  9/1959  Weiss................................ 267/15 A

*Primary Examiner*—Philip Goodman
*Attorney, Agent, or Firm*—Rogers, Ezell & Eilers

[57] ABSTRACT

A vehicle air suspension assembly comprising a first beam, a first air spring mounted between the forward end of the first beam and the vehicle chassis, and a second air spring mounted between the rearward end of the first beam and the vehicle chassis. The assembly also includes a second beam, means for pivotally supporting the forward end of the second beam from the vehicle chassis near the first air spring, and means for pivotally supporting the rearward end of the second beam near the rearward end of the first beam. The vehicle axle is mounted to the first beam, whereby the first beam, and hence the vehicle axle, totally support the vehicle chassis on the air springs, the second beam acting to push and pull the vehicle axle and stabilize the assembly.

Inherent in the assembly design are means for retracting the vehicle axle and means for allowing for oscillation of the axle as caused by one end of the axle moving up or down relative to the other under various load and road conditions.

20 Claims, 10 Drawing Figures

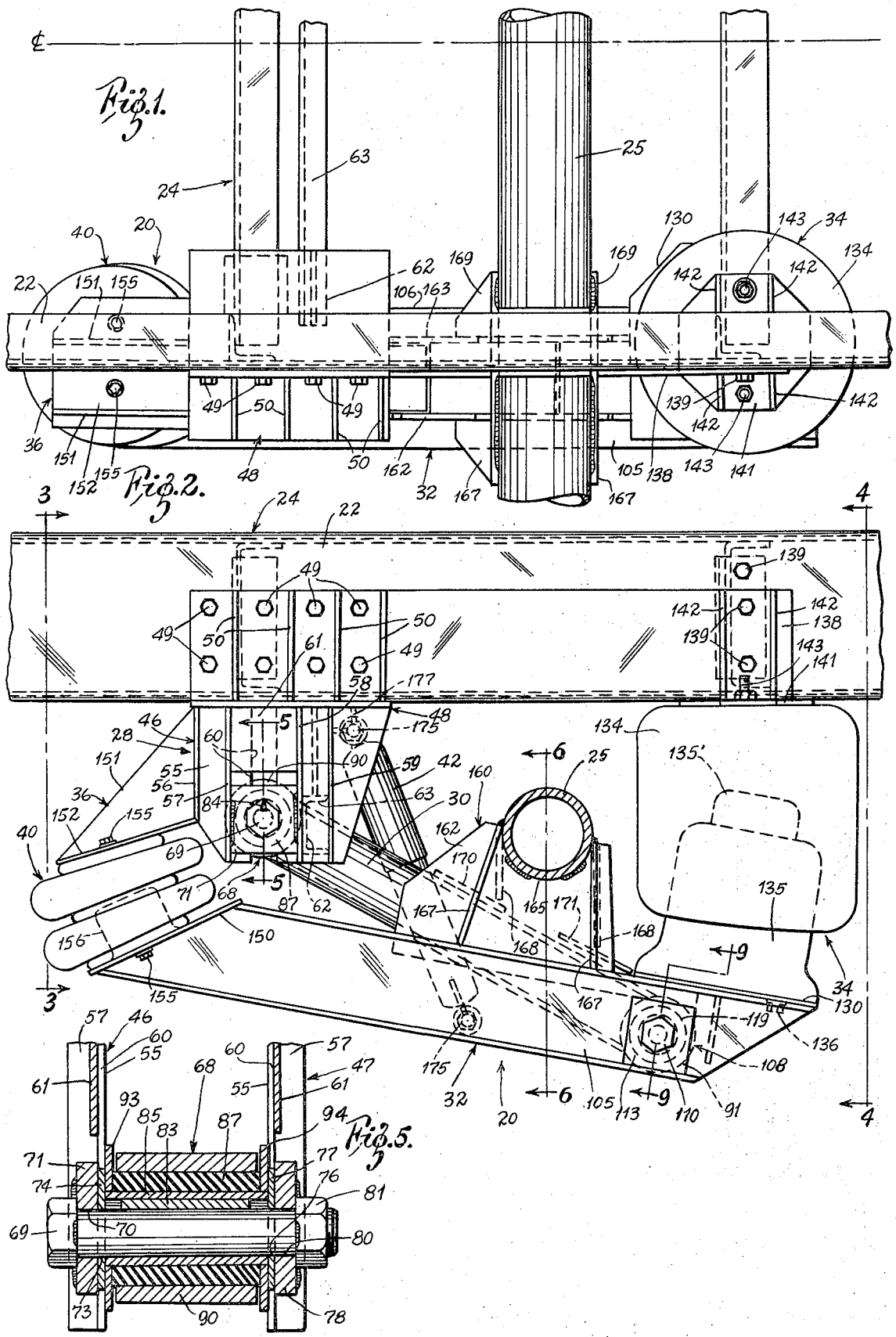

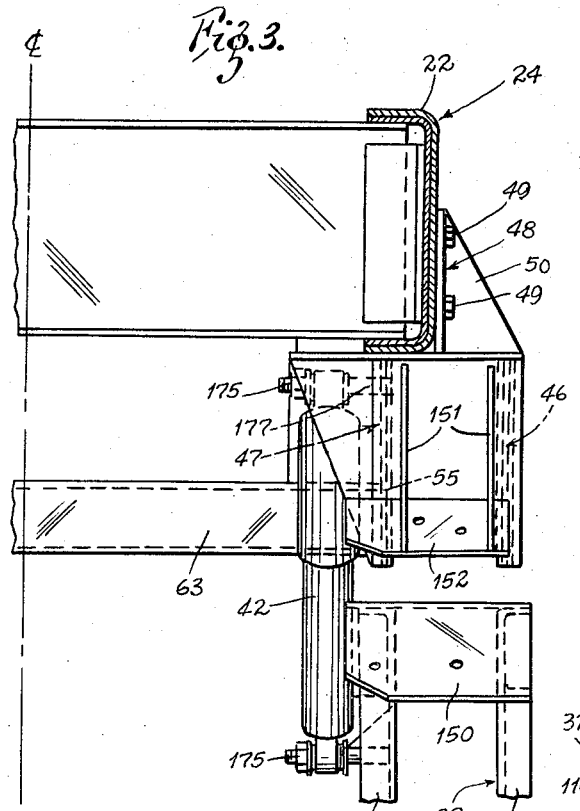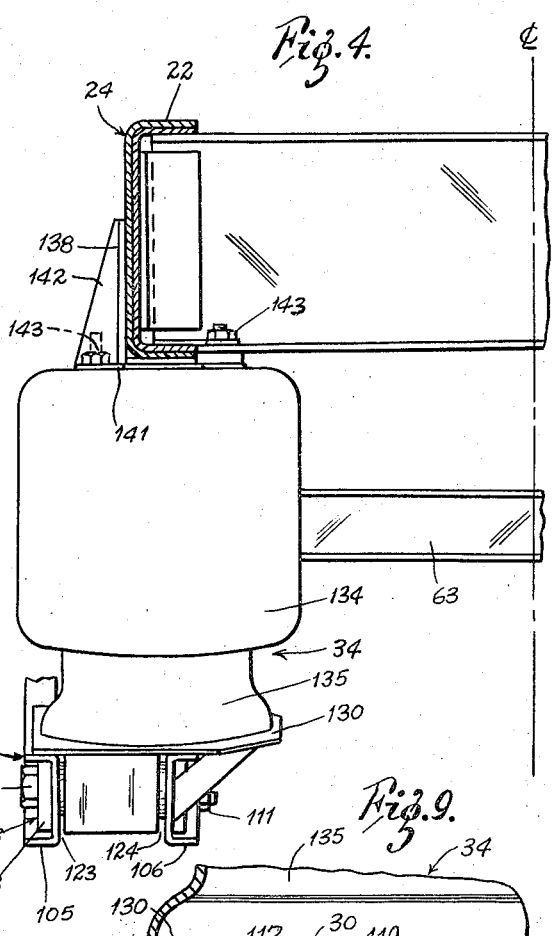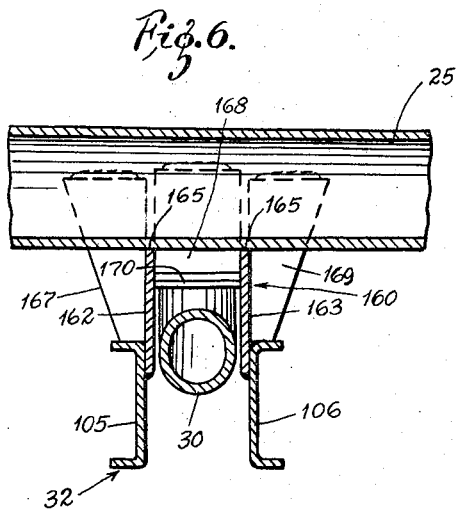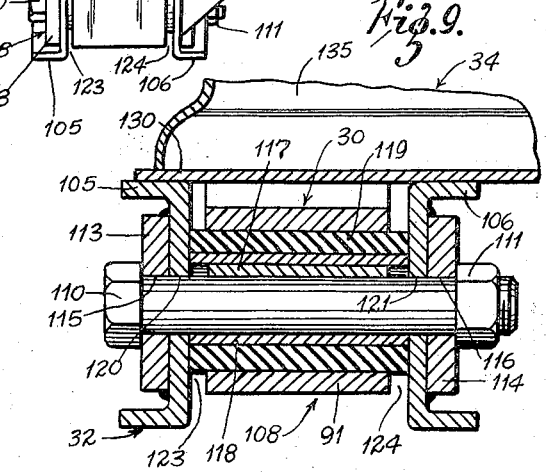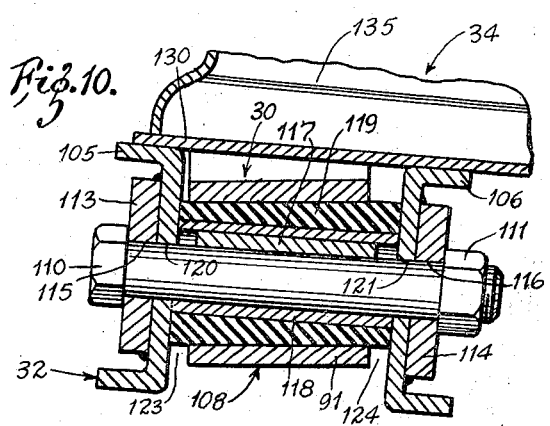

VEHICLE AIR SUSPENSION ASSEMBLY

SUMMARY OF THE INVENTION

This invention relates to a vehicle suspension assembly, and particularly to an air suspension assembly having axle retracting means and which combines an extremely comfortable ride with exceptional stability.

The suspension assembly of this invention includes a hanger assembly depending from the side of the vehicle chassis. The forward end of a torque beam is pivotally mounted about a bushing assembly mounted in the hanger assembly, the torque beam extending rearwardly with its rearward end pivotally mounted about another bushing assembly mounted in the rearward end of a bolster beam. One air spring is mounted between the rearward end of the bolster beam and the vehicle chassis, and another air spring is mounted between the forward end of the bolster beam and the hanger assembly so that the bolster beam is effectively supported at each of its ends to the chassis totally by air springs. One end of a vehicle axle is mounted by means of an axle mounting bracket, which is an integral part of the bolster beam, to the bolster beam so that the axle moves with the bolster beam which in turn moves against the two air springs relative to the vehicle chassis. A shock absorber is mounted between the bolster beam and the vehicle chassis.

With this suspension assembly design the vehicle chassis is supported on the axle with the air springs bearing the total load for exceptional comfort and the torque beam acting to push and pull the vehicle axle and stabilize the assembly. At the same time the design of this invention permits oscillation of the axle about the longitudinal axis of the torque beam which occurs when one end of the axle moves up or down with respect to the other.

Another primary feature of this invention is the use of a stop plate mounted within the axle mounting bracket which bears against the top of the torque beam when the brakes of the vehicle are applied, thus preventing the tendency of the axle to rotate under the great braking forces. Also, the torque beam, the stop plate, and an internal bumper in the forward air spring combine to support the axle in its completely downwardly extended position, thus relieving the strain on the shock absorber customarily used for this purpose.

Inherent in its design is still another primary feature of this invention which provides means for lifting the axle to a retracted position where the vehicle has more than one axle. This is accomplished by depressurizing the rear air spring and maintaining pressure in the forward air spring causing the rearward end of the bolster beam, and hence the axle, to lift under the resultant moment forces about the hanger bushing assembly. Hence, not only does this invention provide a complete air ride suspension but also provides inherent in its design means for retracting the axle.

These and other features of the invention are apparent from the drawings and the detailed description to follow.

DESCRIPTION OF THE DRAWINGS

FIG. 1 is a top plan view of an air suspension assembly of this invention;

FIG. 2 is a side elevation view of the suspension assembly of FIG. 1;

FIG. 3 is a left end elevation view taken along the line 3—3 of FIG. 2 with the double convolution air spring omitted;

FIG. 4 is a right end elevation view taken along the line 4—4 of FIG. 2;

FIG. 5 is an enlarged view in section taken along the line 5—5 of FIG. 2;

FIG. 6 is a view in section taken along the line 6—6 of FIG. 2;

FIG. 9 is an enlarged view in section taken along the line 9—9 of FIG. 2; and

FIG. 10 is a view similar to FIG. 9 to illustrate the oscillating feature of this invention.

DETAILED DESCRIPTION OF A PREFERRED EMBODIMENT

Figure 7:
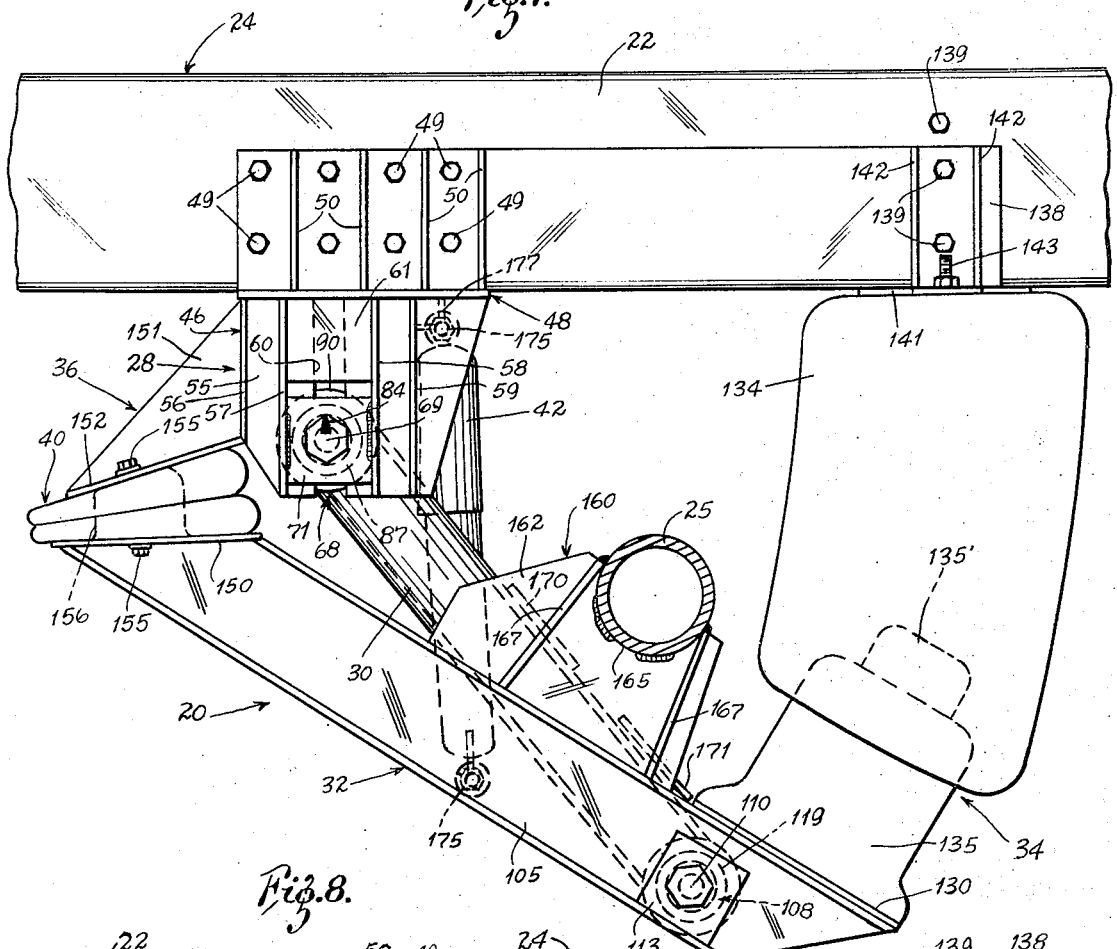
FIG. 7 is a side elevation view similar to FIG. 2 but showing the assembly in its downwardly extended position.

Referring generally to FIGS. 1 and 2 of the drawing, there is shown an air suspension assembly 20 of this invention mounted to a side member 22 of a vehicle chassis 24. The axle 25 of the vehicle is mounted to the suspension assembly below the chassis 24 in a manner to be described.

It is to be understood that the suspension assembly 20 is duplicated on both sides of the chassis with the axle 25 as well as the chassis 24 being similarly connected to both assemblies. It is further to be understood that more than one suspension assembly may be mounted on each side of the chassis such as where multiple axles are used. Because each of the assemblies of this invention are identical, only a single left side assembly will be described, so that in viewing FIG. 2, forward motion of the vehicle is to the left.

The principal components of the suspension assembly 20 comprise a hanger assembly 28 suspended from the side member 22, a torque beam 30 having one end connected to the hanger assembly and its other end connected to one end of a bolster beam 32. Between the same end of the bolster beam 32 and the chassis member 22 is an air spring 34, and between the other end of the bolster beam 32 and a bracket extension 36 of the hanger assembly 28 is a second air spring 40. The axle 25 is connected to the bolster beam 32 and a shock absorber 42 is connected between the bolster beam 32 and the hanger assembly 28.

The hanger assembly 28 comprises a pair of extruded hanger rails 46 and 47, the upper ends of which are welded to a hanger bracket 48. The hanger bracket 48 is fastened by a plurality of bolts 49 to the chassis side member 22 and is suitably reinforced with gusset plates 50.

Each of the hanger rails 46 and 47 is formed with a face plate 55 with vertical webs 56, 57, 58 and 59, and has a central vertical slot 60. A reinforcing plate 61 is welded across the top of the slot 60 of each of the rails 46 and 47. One end 62 of a brace member 63 is welded to the face plate 55 between the webs 58 and 59 of the hanger rail 47, with the other end of the brace member 63 welded to the corresponding hanger rail of the right air suspension assembly (not shown) at the opposite side of the vehicle.

A bushing assembly 68 is mounted between the hanger rails 46 and 47. The bushing assembly 68, as best shown in FIG. 5, comprises a bolt 69 extending through a hole 70 in a plate 71 positioned between the webs 57 and 58 and bearing against the face plate 55 of the rail 46. The shank of the bolt 69 further extends through a hole 73 in a narrower plate 74 which is welded to the inner face of the plate 71 and rides within the slot 60 of the hanger rail 46, and through a hole 76 in another narrow plate 77 that rides within the slot 60 of the hanger rail 47, and which is welded to the inner face of a plate 78. The plate 78 is like the plate 71 but is positioned between the webs 57 and 58, and bears against the face plate 55, of the rail 47. The shank of the bolt 69 extends through a hole 80 in the plate 78. A nut 81 is used to tighten the bushing assembly 68 in place.

The bolt 69 has a cam member 83 which projects to one side and acts as an eccentric. An arrow 84 (FIG. 2) is drawn or stamped on the face of the head of the bolt 69 and points to the central high rise of the cam eccentric 83. A metal sleeve 85 surrounds the shank and cam eccentric 83 of the bolt 69, and a rubber bushing 87 surrounds the sleeve 85. The purpose of the eccentric bolt is to provide means for aligning the axle in the manner described in U. S. Pat. No. 3,510,149. Once the vertical location of the bushing assembly 68 has been selected within the hanger assembly 28 as described in U. S. Pat. No. 3,510,149, the plates 71 and 78 are welded in place.

The torque beam 30 is tubular and terminates at its forward end in a sleeve member 90 and at its rearward end in a sleeve member 91. The sleeve member 90 surrounds the rubber bushing 87 of the bushing assembly 68 for pivotal movement thereabout. Metallic washers 93 and 94 surround the sleeve 85 and are located at opposite ends of the bushing 87 and the sleeve member 90 to provide a relatively tight fit of the sleeve 90 between the hanger rails 46 and 47, thus prohibiting any appreciable movement of the sleeve 90 back and forth between the hanger rails 46 and 47 and prohibiting any appreciable rotation of the torque beam 30 about its longitudinal axis to insure maintenance of proper wheel tracking and alignment as the vehicle rounds corners and the like.

The bolster beam 32 is comprised of two parallel generally U-shaped members 105 and 106 spaced an appropriate distance apart so as to allow the rearward portion of the torque beam 30 to move therebetween. Another bushing assembly 108 is located toward the rearward end of the bolster beam 32 between the members 105 and 106 and is generally identical to the bushing assembly 68 having a bolt 110 and a nut 111 like the bolt 69 and nut 81, plates 113 and 114 like the plates 71 and 78, which plates 113 and 114 are welded to the outer surfaces of the members 105 and 106, and have holes 115 and 116 through which the bolt extends, and a cam member 117, a metallic sleeve 118 and a rubber bushing 119 like the cam member 83, metallic sleeve 85 and rubber bushing 87 of the bushing assembly 68. The members 105 and 106 also have holes 120 and 121 through which the bolt 110 extends.

The rearward sleeve 91 of the torque beam 30 surrounds the rubber bushing 119 of the bushing assembly 108 for pivotal movement thereabout for purposes to be hereinafter described in more detail.

One important difference between the bushing assemblies 68 and 108 is that there are no washers in the bushing assembly 108 such as the washers 93 and 94 in the bushing assembly 68, leaving spaces 123 and 124 between the ends of the sleeve 91 and the members 105 and 106. This, as will be more fully explained, permits oscillation of the axle about the longitudinal axis of the torque beam as where one end of the axle moves up or down under load with respect to its other end.

An air spring mounting plate 130 is welded to the top flanges of the beam 32 at its rearward end. The air spring 34 is of conventional design, having an air spring body 134 above a base 135, and an internal bumper 135' of rubber or other suitable material. The base 135 is mounted such as by bolts 136 to the air spring mounting plate 130. An upper mounting bracket 138, which is actually an extension of the hanger mounting bracket 48, is fastened by bolts 139 to the side member 22 of the vehicle chassis. The bracket 138 includes a horizontal plate 141 and reinforcing gussets 142. The upper side of the air spring body 134 is fastened to the plate 141 by nut and bolt assemblies 143.

The forward end of the bolster beam 32 extends somewhat forward of the hanger assembly 28 and is inclined so that the end tends to face generally upward. The inclined end is covered with a mounting plate 150 which is mounted in place such as by welding. The bracket extension 36 of the hanger assembly 28 has reinforcing gussets 151 to which is mounted at their lower surfaces a plate 152. As best shown in FIG. 2, the plate 152 is not horizontal but is inclined slightly so as to be generally parallel to the plate 150 at the forward end of the bolster beam 32. The air spring 40, of any suitable type such as the double convolution type shown, is mounted between the plates 150 and 152 such as by bolts 155, and includes an internal bumper 156 of rubber or other suitable material.

The axle 25 is mounted to the bolster beam 32 by means of an axle mounting bracket 160 that straddles the torque beam 30 to allow vertical movement of a portion of the torque beam therebetween. The axle bracket 160 includes a pair of parallel vertical plates 162 and 163 welded to the inside surfaces of, and extending upwardly from, the members 105 and 106, respectively, of the bolster beam 32. Each of the plates 162 and 163 has a semi-circular shaped recess 165 of approximately the same radius as the axle 25. The axle 25 is secured in the semi-circular shaped recesses 165 such as by welding. To add side rigidity to the axle mount 160, on each side of the axle there are reinforcing plates 167, 168, and 169 which are shaped generally as shown in FIG. 6. The plates 167 and 169 are mounted outside the plates 162 and 163 and are secured at their lower ends to the plates 162 and 163 and the tops of the members 105 and 106 of the bolster beam 32, and at their tops to the axle such as by welding. The middle plate 168 is mounted at its lower end to the plates 162 and 163 and at its top to the axle also by welding. The middle plate 168 extends only a short distance below the bottom of the axle 25 so as not to impede pivotal movement of the torque beam 30 within the bolster beam 32 and axle bracket 160. Hence, the axle bracket 160 provides a very rigid and secure support for the axle on the bolster beam 32, yet permits movement of the torque beam therein.

While the axle has been described as mounted over the beam 32, it could obviously be mounted under the beam 32 to accommodate lower axle height requirements.

Also mounted between the vertical parallel plates 162 and 163 is a stop plate 170 located just forward of the axle 25 and oriented generally parallel to the longitudinal axis of the torque beam 30. The plate 170 is positioned directly on top of or slightly above the torque beam 30. The purposes of the stop plate 170 are to prevent any tendency for the axle 25 to rotate when the brakes are applied with the vehicle moving forward, and to reinforce the axle bracket 160. It also cooperates with the torque beam 30 and bumper 156 to support the axle in the downwardly extended position as will be described. Another reinforcing plate 171 is mounted between the vertical plates 162 and 163 just rearward of the axle 25 above the torque beam 30.

As best seen in FIGS. 2 and 3 the shock absorber 42, of a type commonly known in the art, is connected by nut and bolt assemblies 175 between the hanger assembly 28 and the bolster beam 32, with the top end of the shock absorber 42 connected to a flange extension 177 of the hanger assembly 28 and its bottom end connected to the inner side of the member 106 of the bolster beam 32 at a location generally beneath the axle 25.

Operation

The functions of the suspension assemblies 20 are to resiliently support varying total loads carried by the vehicle body above the vehicle chassis 24, and to provide an extremely comfortable yet exceptionally stable air spring suspension, as well as a means for retracting selected ones of the axles of a multiple axle vehicle as the vehicle load conditions permit, thus saving unnecessary wear and tear on tires and the like.

Figure 8:
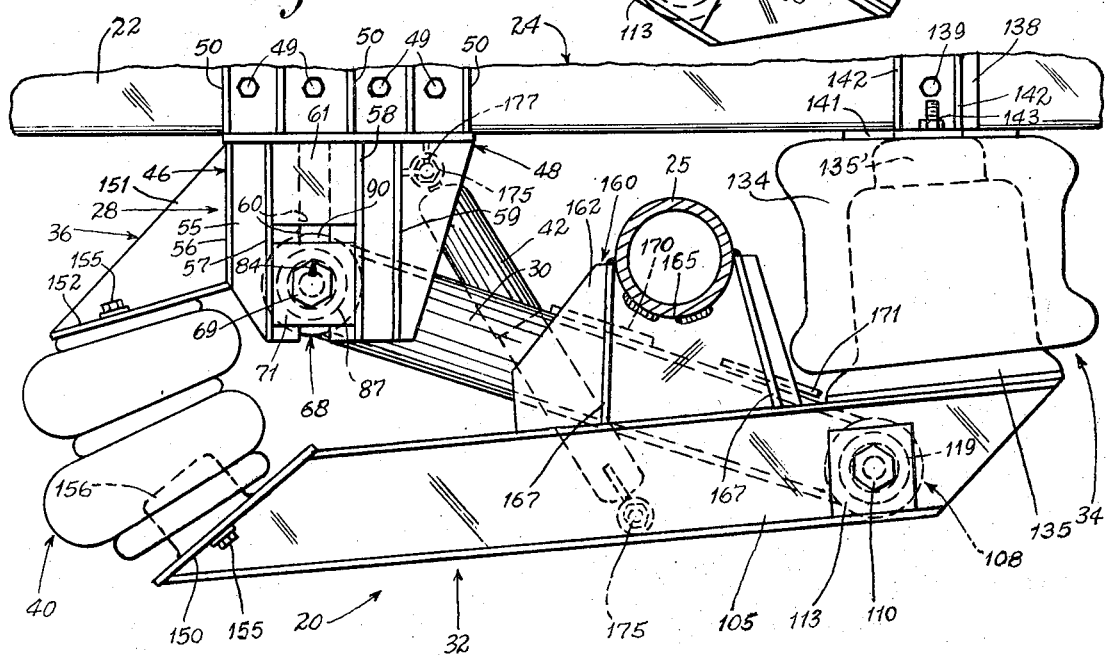
FIG. 8 is a side elevation view similar to FIG. 2 but showing the assembly in its retracted position.

FIGS. 2, 7, and 8 illustrate three conditions of the suspension assembly 20, FIG. 2 illustrating the condition under normal load, FIG. 7 illustrating the extended position such as where the wheel falls into a hole, and FIG. 8 illustrating the retracted position with the wheel off the ground such as is used with multiple axle vehicles under light load conditions.

At the outset it should be noted that the entire load is carried on the two air springs 34 and 40 to provide a completely air spring support of the chassis on the axle with greatly increased comfort. In this described embodiment the spring 34, being the larger of the two, support approximately two-thirds of the load with the axle 25 mounted closer to it than the spring 40. In normal operation, the condition of FIG. 2, both springs 34 and 40 are kept under positive air pressure. When the axle 25 moves upward with respect to the chassis 22 such as where a wheel hits a bump in the road, both air springs 34 and 40 compress an amount depending on the load. As the axle 25 moves downward, such as would occur if the wheel drops into a hole, both of the air springs 34 and 40 extend. It should be noted that as the axle 25 moves up and down under varying load conditions, the bolster beam 32 likewise moves up and down with the rearward end of the torque beam 30 which is attached to the bolster beam 32 by the bushing assembly 108. Hence, this up and down movement causes pivotal movement of the torque beam 30 about the bushing assemblies 68 and 108.

It is a primary feature of this invention that the bushing assemblies 68 and 108 carry none of the load, the load being borne exclusively by the air springs 34 and 40. This not only provides a much more comfortable ride, but also greatly extends the life of the bushing assemblies.

It is another primary feature of this invention that the bushing assemblies 68 and 108 and the torque beam 30 stabilize the suspension assembly, preventing transverse, forward and rearward movement of the axle 25, yet permitting vertical movement of either or both ends of the axle. As previously stated, the bushing assembly 68 has end washers 93 and 94 that prevent the forward end of the torque beam 30 from moving transversely between the hanger rails 46 and 47. These same washers 93 and 94 also prevent rotation of the torque beam 30 about its longitudinal axes. However, the bushing 108 does not have washers such as the washers 93 and 94 thus leaving the spaces 123 and 124 between the ends of the sleeve 91 and the inner surfaces of the members 105 and 106. This permits some oscillating movement of the axle 25 about the longitudinal axis of the torque beam 30, and hence the bushing assembly 108 within the sleeve end 91, due to the inherent flexibility of the rubber bushing 119. For example, if the left end of the axle 25 moves upward with respect to its right end and the chassis 22, the axle 25, its support 160, the bolster beam 32, and the bushing assembly 108 would take the general position shown in FIG. 10, it being remembered that the sleeve end 91 of the torque beam 30 remains generally fixed since the torque beam 30 is prevented from rotating by the washers 93 and 94 in the bushing assembly 68.

The stop 170 is another primary feature of this invention. When the brakes of the vehicle are applied, the great torque forces on the axle 25 tend to rotate the axle 25 in a counterclockwise direction as viewed in FIG. 2. This produces a very unstable condition known as brake-hopping. However, with this invention as the brakes are applied, the stop plate 170 bears down on top of the torque beam 30, preventing any tendency for the axle 25 to rotate and thus preventing brake-hop.

FIG. 7 illustrates the fully extended position of the suspension assembly 20 as would occur if the wheel were to fall into a deep hole or if the chassis were to move suddenly upward to a point where the wheel leaves the ground. In this condition the stop plate 170 bears downwardly on the beam 30 and the air spring 34 is fully extended with the positive pressure in the air spring 40 overcome by the weight of the axle, wheel, etc., such that the air spring 34 becomes fully compressed. With the air spring 34 fully compressed, the torque beam 30 and the internal bumper 156 of the air spring 40 at the forward end of the bolster beam 32 support the vehicle axle 25. This is another primary feature of this invention, for without the torque beam 30 the shock absorber 42 would have to act as the lower limit support for the axle 25 which would cause considerable strain on the shock absorber and greatly reduce its life.

FIG. 8 illustrates the retracted position of the axle 25 which is used to lift the axle and its wheels off the ground. To create this condition, the air spring 34 is depressurized and the air spring 40 is maintained under pressure or increased pressure causing the forward end of the bolster beam 32 to drop and the rearward end of the bolster beam 32 to raise as the torque beam 30 pivots about the bushing assemblies 68 and 108 until bumper 135' hits the top of the air spring 34. The bumpers 135' and 156 each protects the other air spring from overextension. Raising of the rearward end of the bolster beam 32 raises the axle 25. To lower the axle 25 back to its normal operating position, it is only necessary to pressurize the air spring 34.

Various changes and modifications may be made in this invention, as will be readily apparent to those skilled in the art. Such changes and modifications are within the scope and teaching of this invention as defined by the claims appended hereto.

What is claimed is:

1. A vehicle suspension assembly comprising a first beam, first spring means between the forward end of the first beam and the vehicle chassis, the first spring means being mounted at an inclined angle such that extension thereof tends to move the forward end of the first beam in a downward and rearward direction, second spring means between the rearward end of the first beam and the vehicle chassis, a second beam, means associated with the chassis for pivotally supporting the forward end of the second beam from the vehicle chassis, means associated with the first beam for pivotally supporting the rearward end of the second beam from the first beam, and means for mounting the vehicle axle to the first beam.

2. The suspension assembly of claim 1 wherein the rearward end of the second beam is pivotally supported near the rearward end of the first beam, and the vehicle axle is mounted forward of this pivotally supporting means.

3. The suspension assembly of claim 1 wherein the first and second spring means are air springs.

4. The suspension assembly of claim 3 including a hanger assembly depending from the vehicle chassis, and means for pivotally mounting the forward end of the second beam to the hanger assembly.

5. The suspension assembly of claim 1 wherein the pivotally supporting means include bushing assemblies having resilient bushing means therein.

6. The suspension assembly of claim 1 including oscillation dampening means mounted between the first beam and the vehicle chassis.

7. The vehicle suspension assembly of claim 1 including a stop means associated with axle movement and which bears downwardly on the second beam to prevent rotation of the axle when the brakes are applied.

8. The vehicle suspension assembly of claim 1 wherein the pivotally supporting means includes resilient bushing means at least one of which permitting oscillation of the vehicle axle relative to the chassis as occurs where one end of the axle moves up or down relative to its other end.

9. The vehicle suspension assembly of claim 8 wherein only one of the resilient bushing means permits said oscillation.

10. The vehicle suspension assembly of claim 9 wherein the one bushing means is permitted limited rotation about the longitudinal axis of the second beam to accommodate for axle oscillation.

11. The vehicle suspension assembly of claim 10 wherein the one bushing is at the rearward end of the second beam.

12. The vehicle suspension assembly of claim 5 including means associated with at least one of the resilient bushing means for aligning the axle.

13. A vehicle suspension assembly for supporting a vehicle chassis on a vehicle axle comprising an axle mounting bracket to which the vehicle axle is secured, spring means for resiliently supporting the chassis on the axle, a torque beam, means associated with the chassis for pivotally supporting the forward end of the torque beam from the vehicle chassis, means associated with the axle mounting bracket for pivotally supporting the rearward end of the torque beam from the axle mounting bracket, and bearing means mounted to the axle bracket forward of the rearward pivotally supporting means and above the torque beam for bearing downwardly on the torque beam to prevent rotation of the vehicle axle when the vehicle brakes are applied.

14. The suspension assembly of claim 13 wherein the axle is mounted over the torque beam.

15. A retractable vehicle suspension assembly for mounting a vehicle chassis to a vehicle axle comprising a first beam, a first air spring means supported between the forward end of the first beam and the vehicle chassis, the first air spring means being supported such that pressurization thereof produces downward and rearward movement of the forward end of the first beam, second air spring means supported between the rearward end of the first beam and the vehicle chassis, a second beam, means associated with the chassis for pivotally supporting the forward end of the second beam from the vehicle chassis, means associated with the first beam for pivotally supporting the rearward end of the second beam from the first beam, and means for mounting the vehicle axle to the first beam, the second beam being supported between the chassis and first beam and the axle mounting position on the first beam being such that pressurization of the first air spring means and depressurization of the second air spring means creates a moment about the pivotally supporting means at the forward end of the second beam that raises the axle.

16. The retractable suspension assembly of claim 15 wherein the second beam extends downwardly and rearwardly from the chassis to the first beam, and the axle is mounted toward the rear of the first beam.

17. A vehicle suspension assembly comprising a first beam, first spring means between the forward end of the first beam and the vehicle chassis, second spring means between the rearward end of the first beam and the vehicle chassis, a second beam, means associated with the chassis for pivotally supporting the forward end of the second beam from the vehicle chassis, means associated with the first beam for pivotally supporting the rearward end of the second beam from the first beam near the rearward end of the first beam, and means for mounting the vehicle axle to the first beam forward of the rearward pivotal supporting means of the second beam.

18. A vehicle suspension assembly comprising a first beam, first spring means between the forward end of the first beam and the vehicle chassis, second spring means between the rearward end of the first beam and the vehicle chassis, a second beam, means associated with the chassis for pivotally supporting the forward end of the second beam from the vehicle chassis, means associated with the first beam for pivotally supporting the rearward end of the second beam from the first beam, means for mounting the vehicle axle to the first beam, and means associated with axle movement and which bears downwardly on the second beam to prevent rotation of the axle when the brakes are applied.

19. A vehicle suspension assembly comprising a first beam, first spring means between the forward end of the first beam and the vehicle chassis, second spring means between the rearward end of the first beam and the vehicle chassis, a second beam, a first resilient bushing means associated with the chassis for pivotally supporting the forward end of the second beam from the vehicle chassis, a second resilient bushing means associated with the first beam for pivotally supporting the rearward end of the second beam from the first beam, at least one of the resilient bushing means permitting oscillation of the vehicle axle relative to the chassis as occurs where one end of the axle moves up or down relative to its other end, and means for mounting the vehicle axle to the first beam.

20. The retractable vehicle suspension assembly of claim 16 wherein the rearward end of the second beam is pivotally supported near the rearward end of the first beam, and the vehicle axle is mounted forward of this pivotally supporting means.

* * * * *